United States Patent [19]

Mauleon et al.

[11] Patent Number: 4,556,479
[45] Date of Patent: Dec. 3, 1985

[54] METHOD FOR THE CLEAN-UP OF PARTICULATE-CATALYST CONTAINING GASES

[75] Inventors: Jean-Louis Mauleon, Aurora; Robert J. Newman, Englewood; Alan J. Black, Littleton, all of Colo.

[73] Assignee: Total Engineering and Research Company, Denver, Colo.

[21] Appl. No.: 598,705

[22] Filed: Apr. 10, 1984

[51] Int. Cl.[4] .................... C10G 11/18; B01J 29/38; B01D 45/16

[52] U.S. Cl. .......................... 208/164; 55/1; 55/349; 208/161; 422/144; 502/21; 502/41; 502/43

[58] Field of Search ............ 502/5, 21, 39, 41–44; 208/161, 164; 422/144, 223; 55/342, 346, 348, 349, 1

[56] References Cited

U.S. PATENT DOCUMENTS

| | | | |
|---|---|---|---|
| 2,394,680 | 2/1946 | Gerhold et al. | 502/39 |
| 2,529,503 | 11/1950 | Kimball et al. | 422/144 |
| 3,231,326 | 1/1966 | Stine et al. | 422/144 |
| 3,687,841 | 8/1972 | Saxton et al. | 208/164 |
| 4,208,384 | 6/1980 | Mitchell | 502/39 |
| 4,257,788 | 3/1981 | Nassir | 55/346 |
| 4,331,533 | 5/1982 | Dean et al. | 208/113 |
| 4,332,674 | 6/1982 | Dean et al. | 208/120 |
| 4,336,160 | 6/1982 | Dean et al. | 252/417 |

Primary Examiner—P. E. Konopka
Attorney, Agent, or Firm—Sheridan, Ross & McIntosh

[57] ABSTRACT

A process for the clean-up of particulate containing gases is provided wherein a difference in pressures between the pressure of particulate-containing gases in the inlet to cyclone separation means and the pressure in an underflow exit is maintained and controlled. In a preferred embodiment, the particulate-containing gases comprise flue gas from a catalyst regeneration process comprising two separate regeneration zones comprising a low temperature regeneration zone followed by a higher temperature regeneration zone. A CO rich flue gas is recovered from the low temperature regeneration zone and a $CO_2$ rich flue gas is recovered from the higher temperature regeneration zone. The high temperature $CO_2$ rich flue gas is passed through a heat exchanger to produce steam and cool the $CO_2$ rich flue gas. The cooled $CO_2$ rich flue gas is passed through cyclone separators to capture catalyst particles. The particle containing cooled gas is separated according to this invention in two zones maintained at a desired pressure differential and so that the volume of underflow gas moving with the separated catalyst fines is limited.

24 Claims, 1 Drawing Figure

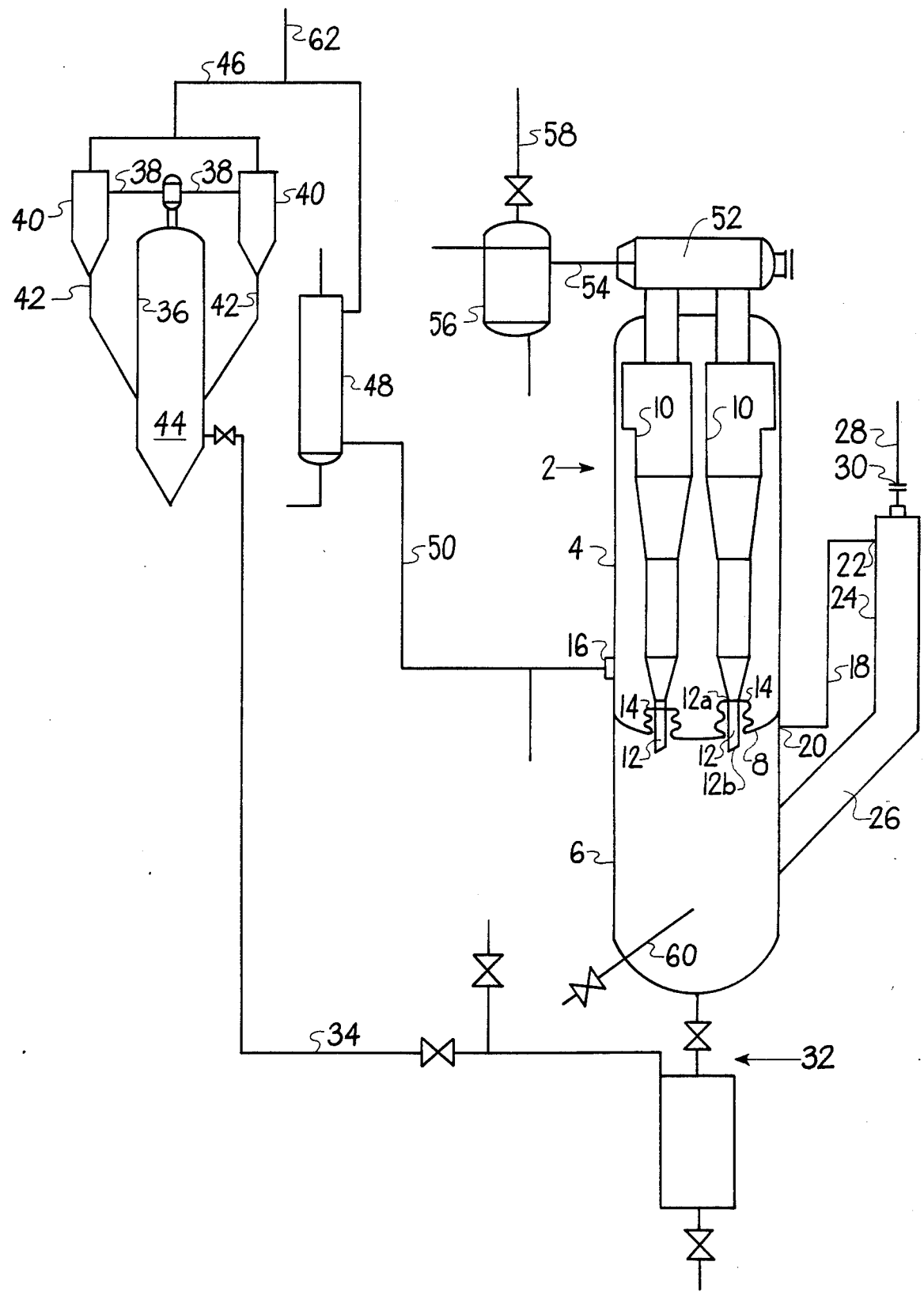

METHOD FOR THE CLEAN-UP OF PARTICULATE-CATALYST CONTAINING GASES

The need for clean-up of particulate containing gases for environmental purposes as well as for purposes of system economics and efficiency is well known. Although electrostatic precipitators have been used by many industries their history of poor performance and large down times leave them undesirable for many uses. Conventional cyclone separation means are widely used in a variety of situations including many where the capacity of multiple cyclones are required. Cyclone efficiency is greatest with heavier loaded gas streams, i.e. gases containing larger amounts of particulate. Exiting gas streams from initial or primary clean-up systems, i.e. the overflow gases, in many instances contain environmentally unacceptable levels of particulates and must thus undergo further clean-up before exhaust to the atmosphere is permitted. Moreover, where the particulate entrained in the flue gas is of value, i.e. comprises catalyst or other costly process reagents, secondary and tertiary clean-up of the exiting flue gases is economically, as well as environmentally, dictated. In some instances, such as flue gases from the second stage of a two-stage catalyst regeneration system, the temperature of the flue gases is high and the relative amount of particulates to the volume of gas is very low so that the effectiveness of cyclone separation has been questionable.

Generally, there are a number of problems associated in situations where such additional flue gas clean-up is required, especially in process plants with capacities which require more than one cyclone in parallel. Whenever cyclones are used, the pressure differential through the separator means must be watched in order to avoid an imbalance whereby particles exiting as underflow are sucked back into the separator. Typically, exit diplegs are used with the dipleg ends beneath a fluidized bed of the separated particles. When multiple cyclones are utilized, it is important that the essential characteristics of the flue gases, and in particular the pressure, entering each of the different cyclone units be kept uniform. Small pressure changes in the fluidized bed can detrimentally effect cyclone operation by creating pressure imbalances. A common plenum or chamber configuration for the cyclones has been used in order to aid maintenance of equal inlet pressures for multiple cyclones as disclosed in U.S. Pat. No. 4,257,788. Nevertheless, control of the pressure differential between cyclone inlets and outlets, particularly, the underflow outlet continues to be a problem.

Combined processes for catalytic cracking of hydrocarbons and catalyst regeneration are known in the art and are typical of processing where secondary flue gas clean up is mandated both environmentally and economically because of the catalyst value. One such combined system is that described in U.S. Pat. Nos. 4,331,533; 4,332,674 and 4,336,160, for converting residual oils by high temperature catalytic cracking and the associated high temperature catalyst regeneration. The $CO_2$ rich flue gases exiting from the second stage regeneration are at high temperatures, such as about 1300° F. to 1800° F., and have entrained catalyst fines and sulfur oxides.

BRIEF DESCRIPTION OF THE INVENTION

This invention relates to a process for cleaning particulate containing gases by inputting the particulate containing gases at a first pressure into cyclone separators to separate the particulate containing gases into a substantially particulate free gas overflow and a gas containing particulate underflow, exiting the underflow at a second pressure and controlling the amount of gas in the underflow by controlling the difference between the first pressure and second pressure.

In the preferred embodiment of the invention, a housing is separated into an upper zone and a lower zone with the cyclone separators located in the upper zone. The particulate-containing gases are passed into the upper zone and portions of these gases enter each cyclone separator at uniform conditions of pressure. In each cyclone these gases are separated into a substantially particulate free gaseous overflow and a gas containing particulate underflow which underflow exits through diplegs or other means into the lower zone. The amount of gas in the underflow is controlled by controlling the difference between the pressure in the upper zone and the pressure in the lower zone. This is preferably accomplished by controlling the pressure in the lower zone such as by controlling the amount of gas exiting the lower zone. The amount of gas in the underflow is preferably in the range of about 0.5 to 5.0 volume percent of the particulate containing gases passed into the upper zone.

The method for this invention is particularly useful in utilizing flue gases from a second stage catalyst regeneration from fluid catalyst cracking processes, such as that described in U.S. Pat. Nos. 4,331,533; 4,332,674 and 4,336,160 and incorporated herein by reference. High temperature flue gases containing catalyst particles as described therein are cooled according to the present invention by being first passed through suitable means to produce steam and reduce the temperature of the flue gases. The cooling of the flue gases reduces the viscosity of the flue gases and lowers the volume of the gases so that increased dust loading is obtained, all of which result in higher efficiency in the operation of the cyclone separators. The cooled flue gases at the reduced temperature are then fed into the upper zone to be processed as described above. The invention also provides means for removing sulfur oxides from the overflow gases.

It is an object of this invention to separate particulate containing gases into a gaseous overflow and a gas containing particulate underflow while controlling the amount of gas in the particulate underflow.

It is another object of this invention to process particulate containing gases by passing the particulate containing gases at a first pressure into separating means to separate the particulate-containing gases into a gaseous overflow and a gas-containing particulate underflow at a second pressure and controlling the amount of gas in the underflow by controlling the difference between the first pressure and the second pressure.

It is a further object of this invention to provide a system for processing high temperature flue gases from a combined hydrocarbon catalytic conversion and two-stage catalyst regeneration process to generate steam, to separate catalyst fines therefrom and to remove sulfur oxides therefrom.

Other features and advantages of the invention will be apparent from the following more particular description of preferred embodiments as illustrated in the accompanying drawing. The drawing is not necessarily to scale, emphasis instead being placed upon illustrating the principles of the invention.

BRIEF DESCRIPTION OF THE DRAWING

The drawing is a schematic illustration of the various components used in one embodiment of this invention wherein the particulate-containing gases are flue gases from a catalyst regeneration process.

DETAILED DESCRIPTION OF THE DRAWING

A system for processing particulate containing gases is disclosed in the drawing. A closed housing 2 is divided into an upper zone 4 and a lower zone 6 by a baffle 8. A plurality of cyclone separators 10 arranged in parallel are mounted in the upper zone 4. An exit passage, e.g. a dipleg 12, extends from each of the cyclone separators 10 and passes through the baffle 8 into the lower zone 6 using the bellows 14. An entrance 16 is provided in the wall of the upper zone 4 so that particulate containing gases may be passed through the entrance 16 into the upper zone 4. A conduit 18 is connected at one end 20 for fluid communication with the lower zone 6 and at the other end 22 is connected for fluid communication with a stripper cyclone 24. Separated catalyst fines move from the stripper cyclone 24 to the lower zone 6 through conduit 26. Substantially particulate free gas moves from the stripper cyclone 24 through conduit 28. Means 30 are provided in the conduit 28 so that an orifice through which the particulate free gas moves may be varied for a purpose to be described below.

Particulate containing gases are charged through entrance 16 into the upper zone 4 in which a plurality of parallel arranged cyclone separators 10 are provided with separate flue gas inlet openings thereto. The individual cyclone diplegs 12 pass downwardly through a solid baffle member 8 separating upper zone 4 from a lower catalyst collecting zone 6 therebelow. The diplegs 12 used in this invention are much shorter than conventional diplegs and are provided only to assure a passageway through the baffle 8. In the preferred embodiment, the length of the dipleg 12 from the top 12a, at the junction of the dipleg 12 with the lower conical portion of the cyclone separator, to the end 12b of the dipleg is at least three times the diameter of the dipleg. The diplegs 12 are sealed with respect to baffle 8 by the expandable bellows 14 permitting maintaining a lower pressure in lower zone 6 than in upper zone 4. In this arrangement of apparatus the particulate-containing gases to be treated, e.g. flue gases, with entrained particulates, are charged into zone 4 for evenly distributed flow at uniform, i.e. substantially equal, conditions of velocity, pressure, etc. into each of the plurality of cyclone separators 10. Preferably the velocity of the particulate containing gases charged to the inlets of the cyclone separators 10 is within the range of about 75 to about 110 feet per second. Since the cyclone separators 10 are located within the upper zone 4, portions of the particulate containing gases enter each of the cyclone separators 10 under essentially the same, i.e. uniform, conditions. Cyclone separated particulates pass downwardly through the cyclone separator to the cyclone dipleg 12 and then to lower zone 6 maintained at a pressure lower than that in upper zone 4. Since the upper zone 4 is at a slightly different pressure than the lower zone 6, the diplegs can be relatively short and are used only to provide a passageway from the upper zone 4 to the lower zone 6. Some of the original gas moves as underflow gas with the particulates into the lower zone 6. The presence of some quantity of underflow gas in the particulate underflow is a necessity to avoid intermittent back flow in diplegs between the cyclone separators with subsequent loss of efficiency resulting from slight pressure pulsations during operation. The underflow gas may be removed from the lower zone 6 and passed through a suitable conduit to a water wash zone as explained below or to the atmosphere. If exhausted directly to the atmosphere, suitable scrubber means can be located in the upper zone 4. The pressure in the lower zone 6 is controlled by varying a restricting orifice so that the flow of the underflow gas into the lower zone 6 is in the range of 0.5 to 5.0 percent by volume of the total flue gas entering into the upper zone 4. Collected catalyst fines may be withdrawn from the bottom of zone 6 through a lock hopper system 32 and then conveyed by conduit 34 to the regeneration zone or to another part of a fluid catalytic cracking process by conduits as desired. Other means such as pressurized gas and/or a catalyst classifier may be used instead of the lock hopper system.

In the preferred embodiment, the gases of the gas-containing particulate underflow are recovered from the lower zone 6 and passed by conduit 18 to a smaller stripper cyclone 24 outside the lower zone 6 from which they are vented to the atmosphere or recovered and processed as discussed below. The flow of the underflow gas through the diplegs 12 with the separated particulates is controlled so as not to exceed more than about 0.5 to 5.0 percent by volume of the total flue gas entering the upper zone 4 by varying a restricting orifice in the means 30 in the conduit 28 connected to stripper cyclone 24. Varying the restricting orifice controls the pressure in the lower zone 6. Since the amount of gas in the underflow depends on the difference in pressure in the upper zone 4 relative to the lower zone 6, controlling the pressure in the lower zone 6 will control the difference in pressure and therefore, the amount of gas in the underflow.

The above described method for the processing of particulate containing gases is particularly useful in the recovering of catalyst fines from the hot flue gases discharged from the second stage of a two stage catalyst regeneration system. These hot flue gases contain both catalyst fines and sulfur oxides.

Referring now to the drawing, there is provided an arrangement of apparatus for recovering catalyst fines entrained with hot regeneration flue gas without encountering many of the prior art problems associated with separating hot sour flue gases and pressure balance dipleg requirements for recovery of cyclone separated catalyst fines, particularly with multiple cyclones. In a particular arrangement of catalyst regeneration in stages, the highest temperature flue gases which are $CO_2$ rich and recovered from the uppermost catalyst regeneration zone are at an elevated temperature above about 1300° F. up to about 1800° F. On the other hand, the flue gases recovered from the first stage of catalyst regeneration rich in CO combustion product gases comprising sulfur oxides, steam and some hydrogen sulfide are recovered at a temperature within the range of about 1100° F. up to about 1500° F. In the regeneration sequence used in this invention, it is intended that the uppermost second stage of catalyst regeneration be at a higher temperature than the first stage by a considerable amount to achieve desired catalyst temperatures as discussed in U.S. Pat. Nos. 4,331,533; 4,332,674 and 4,336,160.

The second stage of catalyst regeneration is normally effected at a pressure lower than the pressure in the first stage by about 5 to 10 psig. Typical pressure in the second stage is in the range of 10 to 25 psig, preferably about 15 psig. This lower pressure decreases the water partial pressure and thus, increases the catalyst stability. The pressure utilized depends upon the pressure balance of the system to achieve desired catalyst flow therethrough. It will be recognized by those skilled in the art, however, that the flue gas processing system hereafter described may be employed with a process comprising a single stage of catalyst regeneration permitting lower temperature catalyst regeneration or with each stage of a two-stage catalyst regeneration operation herein described either alone or combined. Combusting CO rich regeneration flue gases in a zone external to the regeneration zone is further contemplated. High temperature product gases recovered from such combustion may be used in generating process steam either separately or in combination with hot $CO_2$ rich regeneration flue gases recovered from the second stage of catalyst regeneration before processing to remove entrained catalyst fines and sulfur oxides as discussed below.

In the arrangement illustrated in the drawing, a second stage catalyst regeneration zone 36 is disclosed. Regeneration zone 36 is provided with radiating conduit means 38 in open communication with external cyclone separators 40. Diplegs 42 return separated catalyst particles from the cyclone separator to a mass of catalyst being regenerated in zone 44. High temperature flue gases rich in $CO_2$ and comprising entrained particles of catalyst are recovered from the cyclone separation zones as a combined flue gas stream 46. The flue gases with entrained catalyst fines may enter the cyclone separators 40 at a velocity within the range of about 70 to 150 ft./second but preferably not above about 110 ft./second when employing catalyst particles of an average particles size selected from within the range of about 60 microns up to about 100 microns.

High temperature combustion flue gases in excess of about 1300° F. with entrained catalyst fines in conduit 46 are passed to a steam generator 48 wherein the flue gas is typically passed downwardly through steam generator 48 in indirect heat exchange with boiler feed water passed upwardly through a plurality of finned heat exchange tubes. The fins preferably extend in a longitudinal direction so as to lessen the tendency to erode and provide for a self cleaning effect. The steam generator or indirect heat exchanger may be housed in a larger diameter weather shield permitting upflow of cooling air to cool the shell temperature of the heat exchanger sufficient to permit the use of carbon steel or low chrome steel. It is preferred that the velocity of the flue gases entering the heat exchanger be adjusted to provide a velocity thereof not substantially above about 75 feet per second for flow therethrough and recovery therefrom at substantially the same velocity. The flow of flue gases into and downwardly through the heat exchanger is substantially a self cleaning operation which keeps the tubes with heat collecting fins clean for maximum heat exchange with boiler feed water. In one specific operating environment the flue gas with entrained fines is recovered from the heat exchanger at a pressure sufficiently elevated for cascade through the system discussed below. Thus the pressure of the flue gas may be in the range of about 10 to 25 psig when passed through a conduit of a size restriction which increases the heat exchanger discharge velocity of about 75 feet per second to a higher velocity up to about 100 or 150 feet per second and at a lower temperature not substantially exceeding and preferably below about 1000° F. Significant advantages are attributable to processing cooler flue gas with entrained catalyst particles. That is, downstream cyclone separating means are much more efficient since the flue gas viscosity is lower and the volume of the gas becomes lower permitting the use of smaller and more efficient cyclones. Also the entrained catalyst fines or dust loading of the cooled flue gas necessarily increases which contributes to improving cyclone separation efficiency. A further significant advantage resides in minimizing the need for hot vapor expansion joints and for permitting the use of less expensive carbon steel for downstream cooled flue gas cyclones and for vessels housing a plurality of such cyclones. The cooled gases move through conduit 50 and then through entrance 16 into the upper zone 4 to be processed as described above.

Flue gases separated from entrained catalyst fines by the plurality of parallel arranged cyclones 10 are collected in means 52 and pass as a common flue gas stream in conduit 54 for discharge to the atmosphere where permitted or processed as hereinafter discussed. The flue gases recovered from a catalyst regeneration zone will comprise sulfur oxides in a concentration dictated in substantial measure by the heavy oil feed subjected to the catalytic cracking process in which the catalyst is initially employed and the extent of sulfur removed with cracked reaction products. Thus flue gases separated from one or more catalyst regeneration zones and separated from entrained catalyst fines as above discussed may require further treatment to recover sulfur oxides particularly therefrom before venting to the atmosphere. Therefore, in accordance with the flue gas treatment process of this invention, cooled flue gases comprising sulfur oxides and relatively free of catalyst fines, i.e. in which the entrained particles or fines have been minimized according to the process of this invention, are passed in contact with a water wash and a compound of ammonia in zone 56 to react with sulfur oxides to form sulfates thereof recoverable from the flue gases before venting thereof to the atmosphere by means 58. Chemicals other than ammonia compounds can be used to absorb or complex the sulfur oxides. Flue gases recovered from stripper cyclone 24 may also be passed to said water wash step as required to remove sulfur oxides. In some instances, conduit 60 is provided to add gas to assist in moving catalyst particles through and out of the lower zone 6 through the lock hopper system.

In yet another aspect, it is not unusual to add up to about 10% of fresh catalyst for a daily replacement rate. However, depending upon the place of addition in the circulating catalyst system, it is observed that some of the fresh catalyst will be rapidly lost before use as equilibrium catalyst in the circulating catalyst system. To obviate this condition, it is proposed to add the makeup catalyst under appropriate conditions to the circulating catalyst in the combination operation upstream of the riser hydrocarbon feed inlet but downstream of the ultimate catalyst regeneration zone in one or more catalyst regeneration zone arrangements. On the other hand CO rich flue gas combustion products may be added by conduit 62 to conduit 46 for charge to heat exchanger 48. It is also contemplated employing more than one indirect heat exchanger in parallel flow arrangement for recovering heat from high temperature flue gases derived from either one or both of the two-stage regeneration zones discussed above. In any of these arrangements it is preferred that combustion flue gas products be cooled to a level consistent with maintaining an economic operation.

Having thus generally discussed the method and process of this invention and particularly described and discussed operating embodiments thereof, it is to be understood that no undue restrictions are to be imposed by reasons thereof except as defined by the following claims.

What is claimed is:

1. A method for the separation of particulate-catalyst containing gases comprising:
    providing a housing having means dividing said housing into at lest an upper and a lower zone;
    locating at lest one cyclone separating means in said upper zone;
    maintaining said upper zone at a first pressure which is substantially spacially uniform;
    maintaining said lower zone at a substantially uniform second pressure;
    inputting particulate-catalyst containing gases at said first pressure to said cyclone-separating means to separate said particulate-catalyst containing gases into a substantially particulate-catalyst free gaseous overflow and a gas-containing particulate-catalyst underflow;
    exiting said underflow at said second pressure said second pressure being less than said first pressure; and
    controlling the amount of said gas in said gas-containing underflow by controlling the difference between said first pressure and said second pressure.

2. A method as in claim 1 wherein said exiting of said underflow containing said gas is into said lower zone and further comprising:
    exiting gas from said lower zone; and
    controlling the exitihg gas from said lower zone to control the amount of gas in said underflow.

3. A method as in claim 1 and further comprising:
    exiting said gas from said gas-containing particulate-catalyst underflow to another separating means;
    exiting said gas from said another separating means; and
    controlling the exiting gas from said another separating means to control the amount of gas in said underflow.

4. A method as in claim 1 wherein such gas-containing underflow exits into said lower zone and further comprising:
    exiting particulate and gas from said lower zone to another separating means;
    exiting gas from said another separating means; and
    controlling the amount of gas exiting from said another separating means to control the amount of gas in said underflow.

5. A method for the separation of catalyst particles suspended in flue gases comprising:
    providing a housing having means dividing said housing into at least an upper zone and a lower zone;
    maintaining said upper zone at a pressure which is substantially spatially uniform;
    maintaining said lower zone at a substantially uniform pressure lower than the pressure in said upper zone;
    locating cyclone separating means in said upper zone;
    passing flue gases having entrained catalyst particles into said upper zone;
    continuously moving portions of said flue gases into said cyclone separating means to separate said catalyst particles from said flue gases;
    passing separated catalyst fines and some accompanying underflow gas into said lower zone while limiting said accompanying underflow gas to from about 0.5 to 5.0 volume percent of said flue gases passed into said upper zone; and
    recovering flue gases separated from the entrained catalyst fines.

6. A method as in claim 5 and further comprising:
    removing said underflow gas from said lower zone and transferring it through a conduit; and
    controlling the pressure in said lower zone by means located in said conduit.

7. A method as in claim 6 and further comprising:
    varying a restricting orifice in said conduit to control said pressure.

8. A method as in claim 5 and further comprising:
    passing said underflow gas removed from said lower zone through a cyclone separator;
    removing flue gas from said cyclone separator through suitable means; and
    controlling the pressure in said lower zone by means located in said suitable means.

9. A method as in claim 8 and further comprising:
    varying a restricting orifice in said suitable means to control said pressure in said lower zone.

10. A method as in claim 5 and further comprising:
    using a plurality of cyclone separators as said cyclone separating means, each of said cyclone separators having an exit passage;
    connecting said exit passages to bellows mounted on said dividing means; and
    terminating said exit passages a relatively short distance below said dividing means.

11. A method as in claim 10 wherein said exit passages are diplegs and further comprising:
    terminating said diplegs so that the length of each of said diplegs is at least three times the diameter of the dipleg.

12. A method as in claim 5 and further comprising:
    using a plurality of cyclone separators as said cyclone separating means;
    passing said flue gases having entrained catalyst particles into said upper zone at pressures and velocities so that said portions of said flue gases enter the inlets of said cyclone separators at velocities of about 75 to 110 feet per second.

13. A method as in claim 12 and further comprising:
    locating said cyclone separators so that they are parallel to each other.

14. In a combination process of catalyst regeneration and hydrocarbon conversion with hot catalyst particles recovered from catalyst regeneration, a method for recovering heat and catalyst particles from regenerated flue gases which comprises:
    passing high temperature regenerated flue gases through a heat exchanger to generate steam and cool said regenerated flue gases;
    providing a housing having means dividing said housing into at least an upper zone and a lower zone;

passing said cooled regenerated flue gases into said upper zone;

locating cyclone separating means in said upper zone with means thereon extending downwardly and terminating for discharge in said lower zone;

continuously moving portions of said cooled regenerated flue gases with entrained catalyst fines at a first uniform pressure into said cyclone separating means; and passing separated catalyst fines and underflow gases from said cyclone separating means into said lower zone while maintaining said lower zone at a uniform pressure less than said first pressure so as to limit the flow of said underflow gas to from about 0.5 to 5.0 volume percent of said cooled regenerated flue gases passed into said upper zone.

15. A method as in claim 14 and further comprising:
recovering flue gases separated from entrained catalyst fines from said cyclone separating means as a common flue gas stream.

16. A method as in claim 15 and further comprising:
washing said recovered common flue gas stream with water and suitable chemical compounds reactive with sulfur oxides to remove sulfur therefrom before venting the flue gases to the atmosphere.

17. A method as in claim 14 and further comprising:
maintaining said lower zone at a pressure lower than the pressure in said upper zone;
removing underflow gas from said lower zone by suitable means; and
controlling the pressure in said lower zone with means in said suitable means.

18. A method as in claim 17 and further comprising:
varying a restricting orifice in said suitable means to control said pressure in said lower zone.

19. A method as in claim 14 and further comprising:
maintaining said lower zone at a pressure lower than the pressure in said upper zone;
passing said underflow gas from said lower zone to a cyclone separator to remove catalyst fines from said underflow gas;
recovering flue gases from said cyclone separation zone; and
returning separated catalyst fines to said lower zone.

20. A method as in claim 19 and further comprising:
controlling the pressure in said lower zone by acting on said flue gas from said cyclone separator of claim 19.

21. A method as in claim 19 and further comprising:
recovering said flue gas from said cyclone separator of claim 19 through suitable means; and controlling said pressure in said lower zone by varying a restricting orifice in said suitable means.

22. A method as in claim 21 and further comprising:
washing said recovered flue gases with water and at least one chemical compound reactive with entrained sulfur oxides before venting the gases to the atmosphere.

23. A method as in claim 22 and further comprising:
using an ammonia compound as said chemical compound.

24. A method as in claim 14 and further comprising:
recovering high temperature flue gases above about 1300° F. from the second stage of a two-stage catalyst regeneration process essentially as $CO_2$ rich flue gases;
passing said recovered high temperature flue gases through a heat exchanger to produce steam and substantially cool the flue gases below about 1000° F.;
using a plurality of cyclone separators arranged in parallel in said upper zone as said cyclone separating means;
separating entrained catalyst fines from the cooled flue gases in said plurality of cyclone separators in said upper zone; and
discharging cyclone separated fines into said lower zone.

* * * * *